(12) United States Patent
Sugio et al.

(10) Patent No.: US 10,099,159 B2
(45) Date of Patent: Oct. 16, 2018

(54) OIL SEPARATOR AND DRAIN DISCHARGE SYSTEM

(71) Applicant: NABTESCO AUTOMOTIVE CORPORATION, Tokyo (JP)

(72) Inventors: Takuya Sugio, Tokyo (JP); Hiroaki Kawanami, Tokyo (JP)

(73) Assignee: NABTESCO AUTOMOTIVE CORPORATION, Tokyo (JP)

( * ) Notice: Subject to any disclaimer, the term of this patent is extended or adjusted under 35 U.S.C. 154(b) by 63 days.

(21) Appl. No.: 15/121,202

(22) PCT Filed: Feb. 27, 2015

(86) PCT No.: PCT/JP2015/055853
§ 371 (c)(1),
(2) Date: Aug. 24, 2016

(87) PCT Pub. No.: WO2015/129856
PCT Pub. Date: Sep. 3, 2015

(65) Prior Publication Data
US 2017/0007944 A1    Jan. 12, 2017

(30) Foreign Application Priority Data

Feb. 27, 2014 (JP) ................................. 2014-036755

(51) Int. Cl.
*B01D 45/00* (2006.01)
*B01D 19/00* (2006.01)
(Continued)

(52) U.S. Cl.
CPC ......... *B01D 19/0063* (2013.01); *B01D 45/04* (2013.01); *B01D 53/04* (2013.01);
(Continued)

(58) Field of Classification Search
CPC .... B01D 19/0063; B01D 45/04; B01D 53/04; B01D 53/261; B01D 2259/4566;
(Continued)

(56) References Cited

U.S. PATENT DOCUMENTS 4,234,327 A * 11/1980 Wills ..................... B01D 53/26
                                                                  55/310
6,070,339 A     6/2000 Cunkelman
(Continued)

FOREIGN PATENT DOCUMENTS

JP    S57-009320 U    1/1982
JP    S63-103718 U    7/1988
(Continued)

OTHER PUBLICATIONS

International Preliminary Report on Patentability and the Written Opinion of the International Searching Authority as issued in International Patent Application No. PCT/JP2015/055853, dated Aug. 30, 2016.
(Continued)

*Primary Examiner* — Frank M Lawrence, Jr.
(74) *Attorney, Agent, or Firm* — Pillsbury Winthrop Shaw Pittman, LLP

(57) ABSTRACT

An oil separator which can discharge collected liquid in a short time and a collected liquid discharge system are provided. This oil separator performs gas-liquid separation on fluid containing oil and collects liquid, which contains oil. The oil separator is provided with an oil trap, which traps liquid, a reservoir, which stores the liquid trapped by the oil trap, a collected liquid discharge port, which discharges the collected liquid stored in the reservoir, and a three-way valve.

8 Claims, 6 Drawing Sheets

(51) Int. Cl.
*F04B 39/04* (2006.01)
*F04B 39/16* (2006.01)
*B01D 45/04* (2006.01)
*B01D 53/04* (2006.01)
*B01D 53/26* (2006.01)
*B60G 17/04* (2006.01)
*B60T 17/00* (2006.01)

(52) U.S. Cl.
CPC ....... *B01D 53/261* (2013.01); *B60G 17/0408* (2013.01); *B60T 17/004* (2013.01); *F04B 39/04* (2013.01); *F04B 39/16* (2013.01); *B01D 2259/4566* (2013.01)

(58) Field of Classification Search
CPC ... B60G 17/0408; B60T 17/004; F04B 39/04; F04B 39/16
USPC ........................ 96/134; 55/431, 434, DIG. 17
See application file for complete search history.

(56) References Cited

U.S. PATENT DOCUMENTS

| | | | |
|---|---|---|---|
| 2015/0033685 A1 | 2/2015 | Sugio et al. | |
| 2015/0040767 A1 | 2/2015 | Sugio et al. | |
| 2015/0052861 A1 | 2/2015 | Sugio et al. | |
| 2015/0135961 A1 | 5/2015 | Sugio et al. | |
| 2015/0152763 A1* | 6/2015 | Sugio | B01D 45/08 55/385.3 |
| 2015/0343356 A1 | 12/2015 | Sugio et al. | |

FOREIGN PATENT DOCUMENTS

| | | |
|---|---|---|
| JP | 2000-126538 A | 5/2000 |
| JP | 2008-173544 A | 7/2008 |
| JP | 2013-234632 A | 11/2013 |
| WO | WO 2013/168758 A1 | 11/2013 |

OTHER PUBLICATIONS

International Search Report as issued in International Patent Application No. PCT/JP2015/055853, dated Apr. 7, 2015.

\* cited by examiner

OIL SEPARATOR AND DRAIN DISCHARGE SYSTEM

CROSS-REFERENCE TO RELATED APPLICATIONS

This application is the U.S. National Stage of PCT/JP2015/055853, filed Feb. 27, 2015, which in turn claims priority to Japanese Patent Application No, JP 2014-036755, filed Feb. 27, 2014. The contents of these applications are incorporated herein by reference in their entireties.

TECHNICAL FIELD

The present invention relates to an oil separator and a collected liquid discharge system that collect liquid and discharge the collected liquid.

BACKGROUND ART

For example, systems of vehicles such as brakes and suspensions actuate various devices using compressed air. Some of such systems include a compressed air drying system located downstream of the compressor to remove water and oil from compressed air.

An example of a known compressed air drying system includes an air dryer, which includes a desiccant, and an oil separator (for example, see Patent Document 1). The oil separator collects liquid that contains oil and water and is discharged from the air dryer by regenerating the desiccant.

PRIOR ART DOCUMENT

Patent Document

Patent Document 1: Japanese Laid-Open Patent Publication No. 2013-234632

SUMMARY OF THE INVENTION

Problems that the Invention is to Solve

The conventional oil separators, however, drain the collected liquid by gravity, and thus take a long time to drain the collected liquid.

Accordingly, it is an objective of the present invention to provide an oil separator and a collected liquid discharge system that discharge collected liquid in a short time.

Means for Solving the Problems

Means and operation for solving the above issue will now be described.

To achieve the foregoing objective, an oil separator is provided that separates gas and liquid in fluid containing oil to collect liquid, which contains oil. The oil separator includes an oil trap, which traps liquid, a reservoir, which stores the liquid that is trapped by the oil trap, a collected liquid discharge port, which discharges the liquid stored in the reservoir, and a mechanism that increases an internal pressure of the reservoir.

With this configuration, when collected liquid is discharged from the reservoir, the internal pressure of the reservoir is increased to push out the collected liquid through the collected liquid discharge port. Thus, the collected liquid in the oil separator is discharged in a short time.

The oil separator preferably further includes a liquid inlet port, through which liquid flows in, an air discharge port, which discharges air separated from the fluid, and a directional control valve, which is connected to a conduit connected to one of the liquid inlet port and the air discharge port, a gas supply passage, which is connected to a gas supply source, and a liquid discharge passage, which delivers liquid to the oil separator. The directional control valve is configured to switch between a first communication state, in which the directional control valve connects the liquid discharge passage to the one of the liquid inlet port and the air discharge port, and a second communication state, in which the directional control valve connects the gas supply passage to the one of the liquid inlet port and the air discharge port. In the first communication state, the fluid flowing through the directional control valve flows from the liquid discharge passage to the one of the liquid inlet port and the air discharge port. In the second communication state, the fluid flowing through the directional control valve flows from the gas supply passage to the one of the liquid inlet port and the air discharge port.

With this configuration, when liquid containing oil is collected by the oil separator, fluid flowing through the directional control valve flows from the liquid discharge passage to one of the liquid inlet port and the air discharge port. Furthermore, when the liquid collected in the oil separator is discharged, the fluid flowing through the directional control valve flows from the air supply passage toward one of the liquid inlet port and the air discharge port. Thus, gas delivered from the gas supply source is caused to flow into the oil separator to increase the pressure in the oil separator. The pressure increase pushes the stored liquid toward the collected liquid discharge port. For this reason, the liquid collected in the oil separator is discharged in a short time.

The oil separator preferably further includes an on-off valve, which selectively opens and closes the other one of the liquid inlet port and the air discharge port. The on-off valve is closed when the communication state of the directional control valve is in the second communication state.

With this configuration, when the liquid collected in the oil separator is discharged, the other one of the liquid inlet port and the air discharge port, that is, the one that is not connected to the gas supply passage is closed. Thus, gas is supplied to the oil separator from one of the liquid inlet port and the air discharge port that is connected to the gas supply passage to further increase the pressure in the oil separator. For this reason, the collected liquid is discharged in a short time.

The oil separator is preferably configured such that the liquid inlet port is configured to be connected to an air dryer, which includes a desiccant and dries compressed air, and separate gas and liquid in fluid that is discharged from the air dryer and contains oil, thereby collecting liquid, and that the directional control valve is configured to be connected to an air tank, which stores compressed dried air that has flowed out of the air dryer via the gas supply passage.

With this configuration, since the gas supply passage is connected to the air tank, in which the compressed dried air that has flowed out of the air dryer is stored, the existing air tank is utilized, eliminating the need for providing a dedicated air tank for discharging collected liquid from the oil separator.

To achieve the foregoing objective, a collected liquid discharge system is provided that includes the above described oil separator and a gas supply source, which supplies gas to the oil separator.

With this configuration, when the liquid containing oil is collected by the oil separator, the directional control valve switches the flow direction in a section upstream of the oil separator such that fluid flows from the liquid discharge passage toward the oil separator. When the liquid that is collected by the oil separator is discharged, the directional control valve switches the flow direction in the section upstream of the oil separator such that gas flows from the gas supply passage toward the oil separator. Thus, gas delivered from the gas supply source is caused to flow into the oil separator to increase the internal pressure in the oil separator. The pressure increase pushes out the stored liquid through the collected liquid discharge port. For this reason, the liquid collected in the oil separator is discharged in a short time.

Effects of the Invention

The present invention provides an oil separator and a collected liquid discharge system that discharge collected liquid in a short time.

MODES FOR CARRYING OUT THE INVENTION

First Embodiment

A first embodiment will now be described with reference to FIGS. 1 to 6. In the present embodiment, a collected liquid discharge system is provided as part of a compressed air drying system, which dries compressed air delivered from a compressor. The compressed air drying system is mounted on a vehicle with an internal combustion engine.

Figure 1:
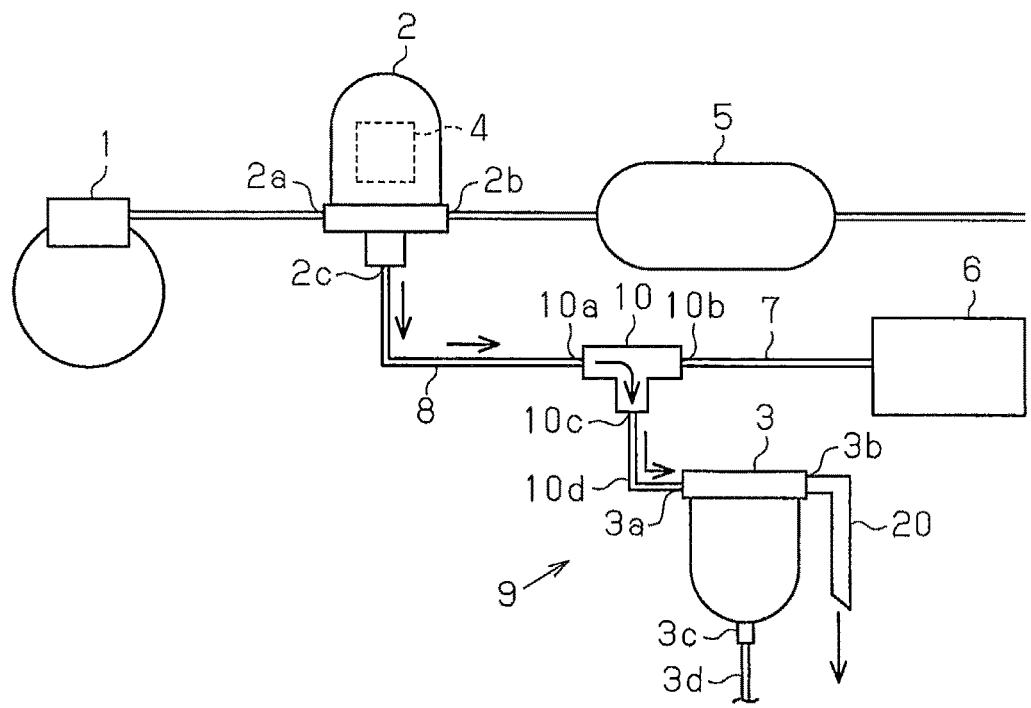
FIG. 1 is a schematic diagram illustrating a collected liquid discharge system according to a first embodiment.

As shown in FIG. 1, the compressed air drying system includes a compressor 1, an air dryer 2, and an oil separator 3. The compressor 1 is coupled to the internal combustion engine of the vehicle. The compressed air delivered from the compressor 1 contains water and oil originating from, for example, lubricant. The water is contained in the compressed air primarily as water vapor, and oil is contained in the compressed air primarily as oil mist.

The air dryer 2 contains a desiccant 4 and a filter (not shown) for trapping oil mist. The air dryer 2 includes an inlet 2a and an outlet 2b. The compressed air delivered from the compressor 1 flows in through the inlet 2a. The compressed air from which water and oil have been removed, or compressed dried air flows out through the outlet 2b. The compressed dried air that has flowed out through the outlet 2b is stored in an air tank 5. The compressed dried air stored in the air tank 5 is supplied to, for example, a brake system or an air suspension system.

The air dryer 2 executes, besides a loading mode operation for trapping water and oil contained in compressed air, unloading mode operation, in which water and oil trapped by, for example, the desiccant 4 are expelled to the outside to regenerate the desiccant 4. Fluid containing liquid, which includes water and oil, and air (purge air) to be discharged by execution of the unloading mode operation is discharged to the oil separator 3 through a liquid discharge port 2c of the air dryer 2.

The oil separator 3 includes a liquid inlet port 3a, which is connected to the liquid discharge port 2c of the air dryer 2, and an air discharge port 3b. The oil separator 3 separates gas and liquid in the fluid that has flowed in through the liquid inlet port 3a. The gas, which is the separated clean air, is expelled into the atmosphere through the air discharge port 3b, and the collected liquid is stored in the interior of the oil separator 3.

A collected liquid discharge port 3c for discharging collected liquid to the outside is provided in the bottom portion of the oil separator 3. A collected liquid discharge hose 3d is connected to the collected liquid discharge port 3c. When no collected liquid is discharged from the oil separator 3, the collected liquid discharge hose 3d is secured to a predetermined position such that the outlet of the collected liquid discharge hose 3d is placed vertically upward from the collected liquid discharge port 3c. When collected liquid is discharged from the oil separator 3, the outlet of the collected liquid discharge hose 3d is placed vertically downward from the collected liquid discharge port 3c of the oil separator 3.

Furthermore, a liquid discharge passage 8 is connected to the liquid discharge port 2c of the air dryer 2. A directional control valve, which is a three-way valve 10 in this embodiment, is connected to the outlet of the liquid discharge passage 8. The three-way valve 10 corresponds to a mechanism for increasing the internal pressure of a reservoir, which is provided in the oil separator 3 and stores the collected liquid. The three-way valve 10 includes a first inlet 10a, which is connected to the liquid discharge port 2c of the air dryer 2 via the liquid discharge passage 8, a second inlet 10b, to which air is supplied from the outside, and an outlet 10c, which is connected to the liquid inlet port 3a of the oil separator 3. The second inlet 10b is connected to an air supply device 6 via an air supply passage 7. The air supply device 6 is, for example, an air tank provided for discharging of the collected liquid. The outlet 10c of the three-way valve 10 is connected to the liquid inlet port 3a of the oil separator 3 via a conduit, which is a coupling passage 10d in this embodiment. The oil separator 3 and the air supply device 6 configure a collected liquid discharge system 9.

The three-way valve 10 switches the direction of an L-shaped flow passage within the three-way valve 10 in accordance with the difference between the pressure at the first inlet 10a and the pressure at the second inlet 10b. The three-way valve 10 switches the communication state between a first mode, in which the first inlet 10a communicates with the outlet 10c, and a second mode, in which the second inlet 10*b* communicates with the outlet 10*c*. The first inlet 10*a* does not communicate with the second inlet 10*b*. In the first mode, the fluid flowing through the three-way valve 10 has an L flow pattern (see FIG. 1) from the first inlet 10*a* toward the outlet 10*c*, and in the second mode, the fluid flowing through the three-way valve 10 has an L flow pattern from the second inlet 10*b* toward the outlet 10*c* (see FIG. 2).

When the fluid, which contains liquid, is discharged from the air dryer 2 via the liquid discharge passage 8, the three-way valve 10 switches the flow direction such that the fluid flows from the first inlet 10*a* toward the outlet 10*c*. Accordingly, the fluid, which contains liquid, flows into the liquid inlet port 3*a* of the oil separator 3 via the coupling passage 10*d*.

Figure 2:
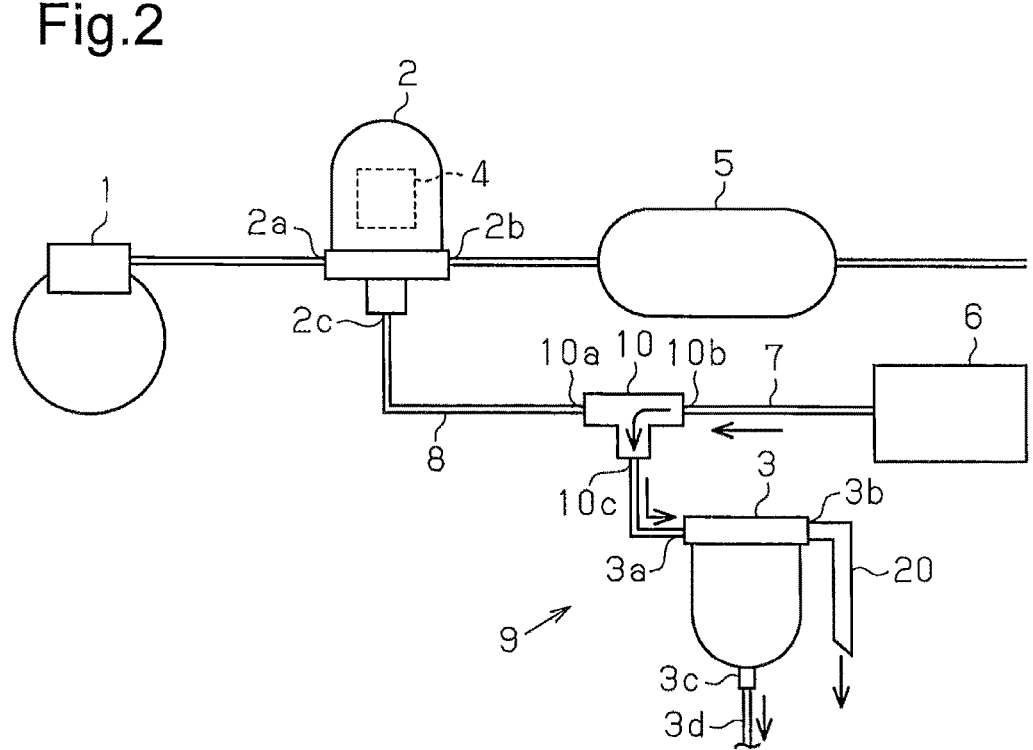
FIG. 2 is a schematic diagram illustrating the collected liquid discharge system according to the first embodiment.

As shown in FIG. 2, when the liquid collected in the oil separator 3 is discharged, a supply valve (not shown) of the air supply device 6 is opened to supply air into the oil separator 3 via the air supply passage 7. In this case, the three-way valve 10 switches the flow direction such that air flows from the second inlet 10*b* toward the outlet 10*c*. This increases the pressure of the air that has flowed into the oil separator 3, thus pushing the collected liquid to be discharged from the collected liquid discharge port 3*c*.

The structure of the oil separator 3 will now be described with reference to FIGS. 3 to 5.

Figure 3:
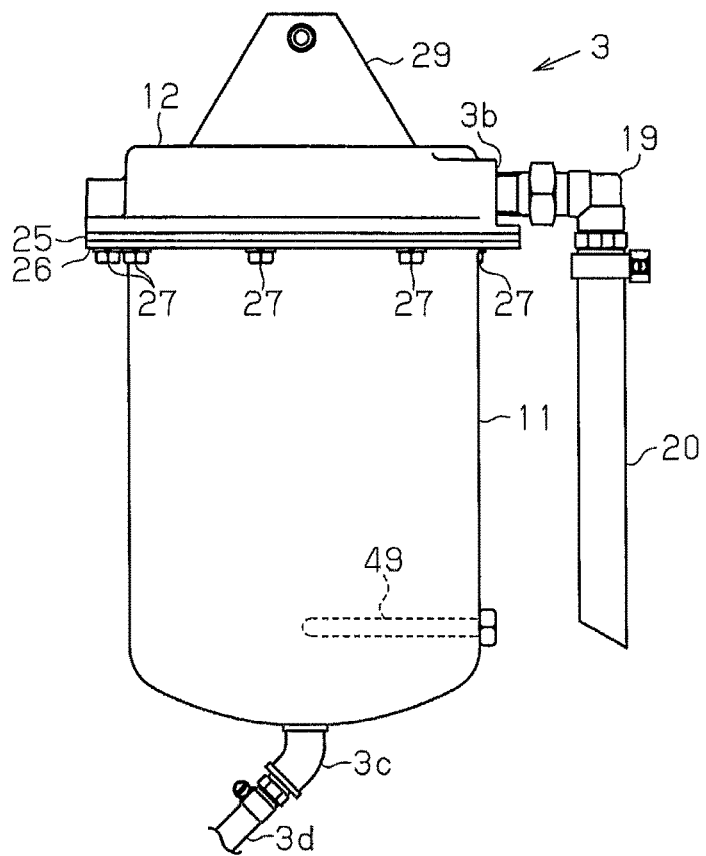
FIG. 3 is a side view of the oil separator according to the first embodiment.

As shown in FIG. 3, the oil separator 3 includes a cylindrical case 11 having a closed end and a lid 12, which seals the opening portion of the case 11. The collected liquid discharge port 3*c* described above is provided at the bottom portion of the case 11.

The lid 12 has the air discharge port 3*b*, from which cleaned air is discharged. The air discharge port 3*b* is connected to an air discharge hose 20, which expels cleaned air into the atmosphere, via a discharge coupling member 19. The lid 12 also has a mounting plate 29, which secures the oil separator 3 to a receiving body.

Figure 4:
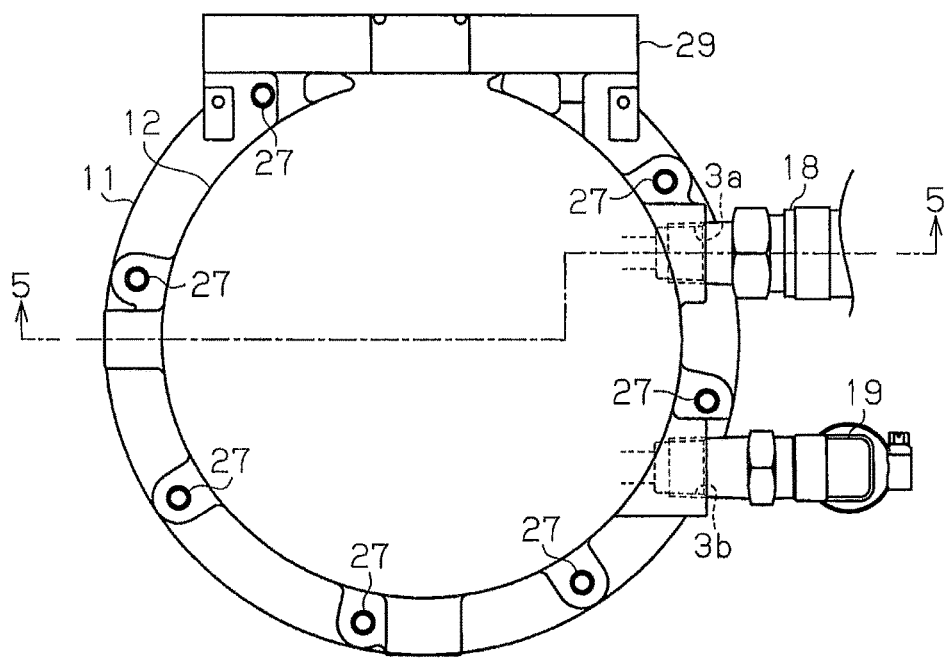
FIG. 4 is a plan view of the oil separator according to the first embodiment.

As shown in FIG. 4, the lid 12 has the liquid inlet port 3*a* described above in addition to the air discharge port 3*b*. A hose for supplying air that has flowed out from the air dryer 2 is connected to the liquid inlet port 3*a* via an introduction coupling member 18.

Figure 5:
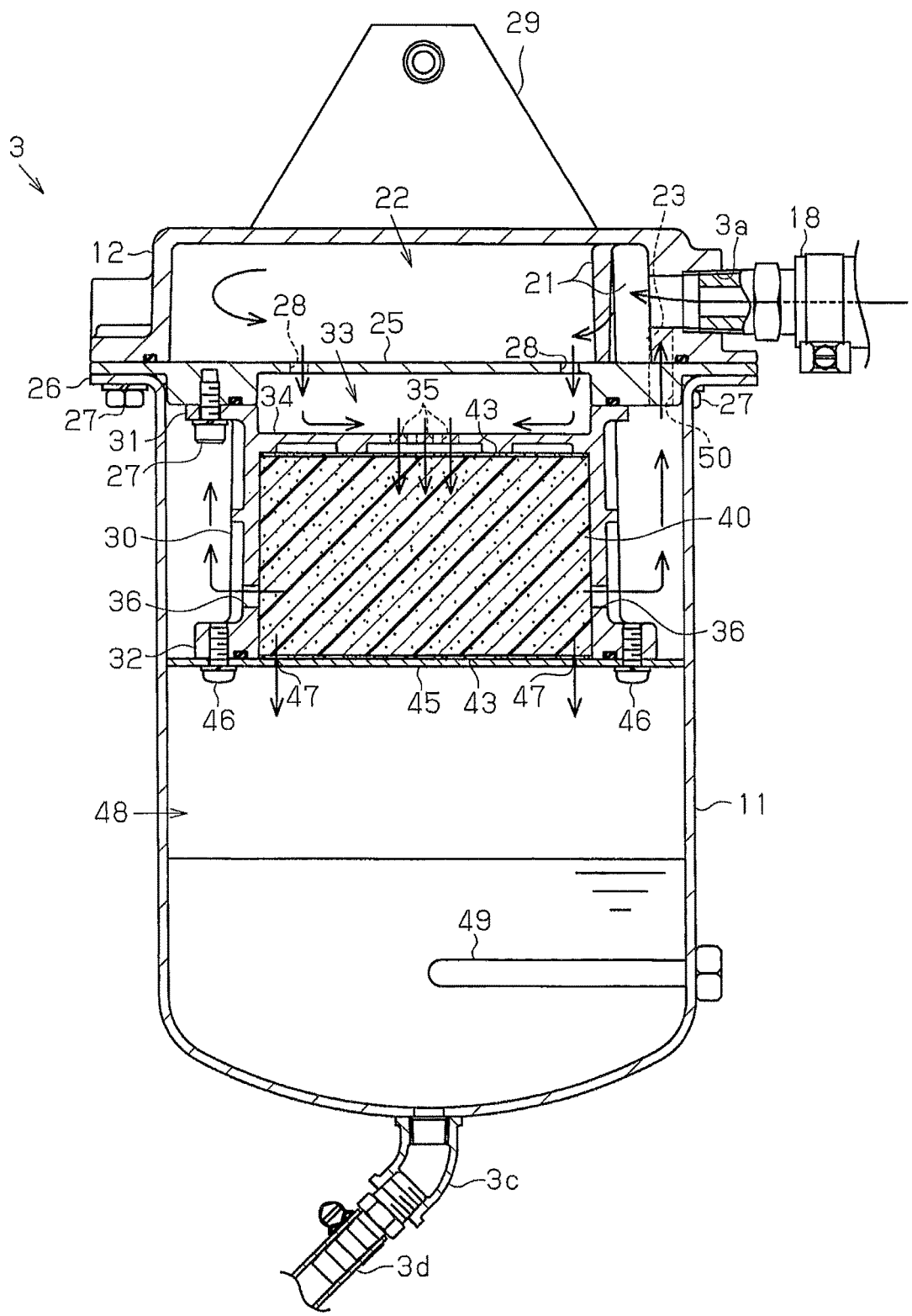
FIG. 5 is a cross-sectional view of the oil separator according to the first embodiment when the oil separator collects liquid.

As shown in FIG. 5, a disk-shaped cover 25 is provided between the case 11 and the lid 12. The case 11, the cover 25, and the lid 12 are secured to one another by fastening bolts 27 in through-holes formed in a flange portion 26 of the case 11, through-holes formed in the cover 25, and threaded bores formed in the lid 12.

The space defined by the cover 25 and the lid 12 functions as a first expansion chamber 22. A communication hole 28 is formed at the center portion of the cover 25. Furthermore, a cylindrical accommodation member 30 having a lid is secured to the bottom surface of the cover 25 with bolts 27. Flange portions 31, 32 are respectively formed on the upper end and the lower end of the accommodation member 30. The accommodation member 30 is fastened to the cover 25 by inserting the bolts 27 through the flange portion 31. The space defined by the upper surface of the fastened accommodation member 30 and the cover 25 functions as a second expansion chamber 33. The above-mentioned communication hole 28, which is formed in the cover 25, connects the first expansion chamber 22 to the second expansion chamber 33.

Through-holes 35 are formed at the center portion of an upper wall 34 of the accommodation member 30. The through-holes 35 and the communication hole 28 of the cover 25 are formed at positions that are not opposed to each other. Through-holes 36 are formed at the lower end of the side wall of the accommodation member 30 at intervals in the circumferential direction.

The accommodation member 30 accommodates an oil trap 40, which removes oil contained in purge air. The oil trap 40 collects oil by causing oil particles to strike the oil trap 40. In the present embodiment, the oil trap 40 is made of a porous plastic sponge (urethane foam). Plates 43 with many through-holes are provided on the upper surface and the bottom surface of the sponge.

A support disk 45 for supporting the oil trap 40 is secured to the flange portion 32, which is formed at the lower end of the accommodation member 30, with screws 46. The support disk 45 has a diameter that is substantially equal to the inner diameter of the case 11. The support disk 45 includes through-holes 47 for allowing, for example, liquid oil trapped by the oil trap 40 to drop.

A reservoir, which is a collected liquid storage portion 48 in this embodiment, is provided at the lower section of the case 11 and stores the collected liquid that has dropped through the through-holes 47. A heater 49 for heating the stored liquid to vaporize water is provided in the collected liquid storage portion 48. Heating of the heater 49 is controlled by using a non-illustrated thermostat.

Operation of the oil separator 3 configured as described above will now be described with reference to FIGS. 5 and 6.

When fluid that contains purge air and liquid is discharged from the air dryer 2, the fluid flows into the liquid inlet port 3*a* of the oil separator 3 via the three-way valve 10.

As shown in FIG. 5, the purge air that has flowed in through the liquid inlet port 3*a* strikes baffle plates 21 and is then introduced into the first expansion chamber 22 to be expanded. The purge air that has been expanded in the first expansion chamber 22 flows into the second expansion chamber 33 through the communication hole 28, which is formed in the cover 25, and is expanded in the second expansion chamber 33. The expanded purge air flows into the oil trap 40 in the accommodation member 30 through the through-holes 35 in the upper wall 34 of the accommodation member 30 and passes through the interior of the oil trap 40. This configuration removes oil particles and water contained in the purge air.

The liquid water and oil trapped by the oil trap 40 moves through the oil trap 40, reaches the upper surface of the support disk 45, and drops through the through-holes 47 in the support disk 45 to be stored in the collected liquid storage portion 48. In a case in which collected liquid flows into the oil separator 3 also, the liquid moves along the same path as described above, passes through the oil trap 40, and drops into the collected liquid storage portion 48. The collected liquid stored in the collected liquid storage portion 48 is heated by the heater 49 so that the water is vaporized.

The cleaned air, from which water and oil have been removed by the oil trap 40, flows through the through-holes 36 in the side surface of the accommodation member 30 into the space formed between the accommodation member 30 and the case 11. The air that has passed through the space passes through a communication hole 50 formed in the cover 25 and a communication portion 23 in the lid 12 and is then discharged through the air discharge port 3*b*.

Operation when the liquid collected by the oil separator 3 is discharged will now be described. The collected liquid is discharged from the oil separator 3 with the operation of the compressor 1 being stopped by stopping the internal combustion engine of the vehicle. To start discharging of the collected liquid, the collected liquid discharge hose 3*d*, which is connected to the oil separator 3, is moved from the predetermined position to open the collected liquid discharge port 3c as described above. The supply valve of the air supply device 6 is opened to supply air into the air supply passage 7. The three-way valve 10 switches the internal flow direction such that air flows from the second inlet 10b toward the outlet 10c to supply air to the liquid inlet port 3a of the oil separator 3.

Figure 6:
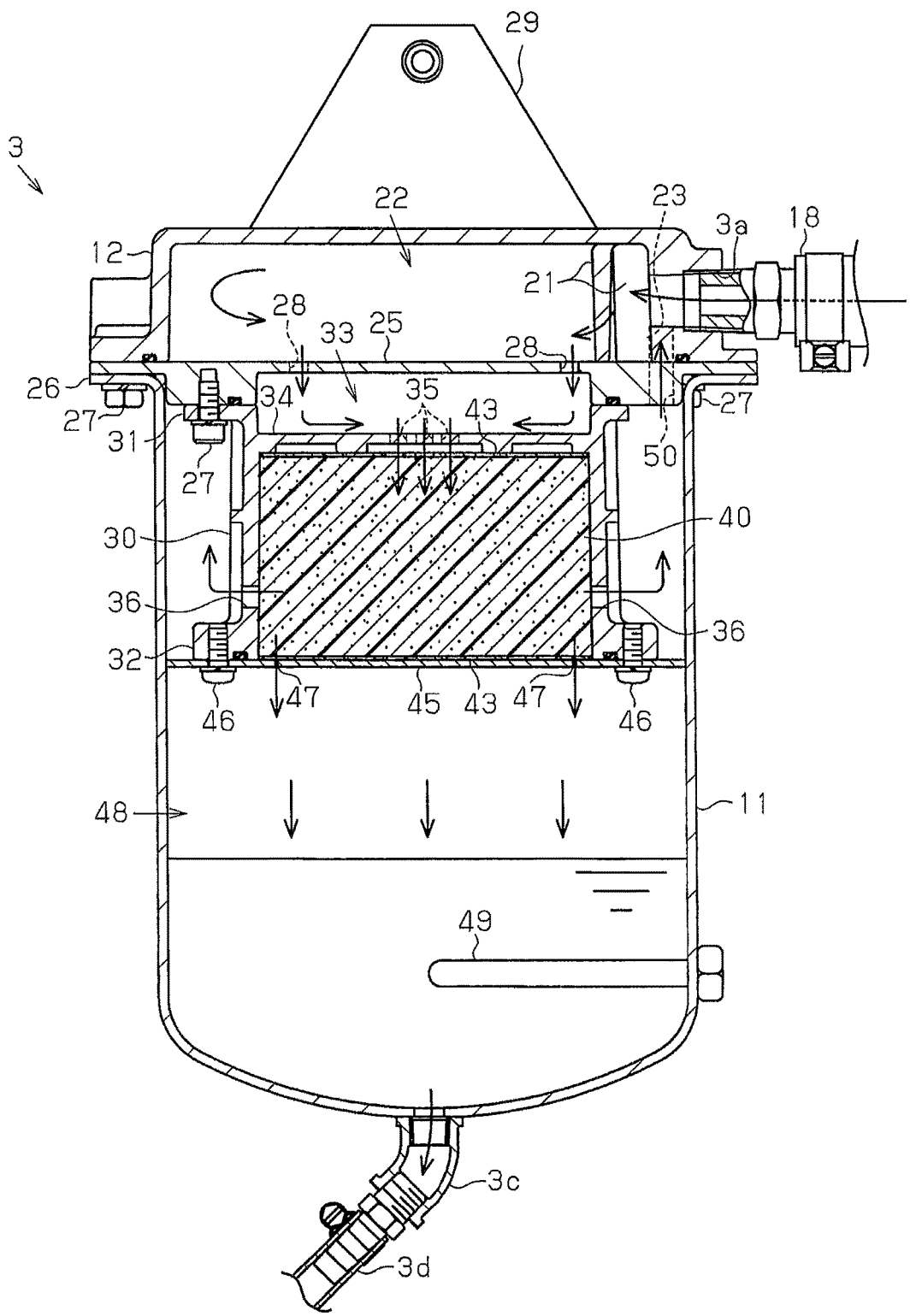
FIG. 6 is a cross-sectional view of the oil separator according to the first embodiment when the oil separator discharges collected liquid.

As shown in FIG. 6, the air supplied from the air supply device 6 passes through the liquid inlet port 3a, the first expansion chamber 22, the second expansion chamber 33, and the oil trap 40 in the same manner as when the fluid, which contains liquid, is discharged from the air dryer 2. Some of the air that has passed through the oil trap 40 passes through the space between the accommodation member 30 and the case 11 to be discharged from the air discharge port 3b. The remaining part of the air that has passed through the oil trap 40 is introduced into the collected liquid storage portion 48. As a result, the pressure in the collected liquid storage portion 48 is increased, and the pressure increase pushes out the collected liquid stored in the collected liquid storage portion 48 through the collected liquid discharge port 3c. Consequently, compared to a case in which no air is supplied to the oil separator 3, the flow rate of the collected liquid discharged from the collected liquid discharge port 3c per unit time is increased, which allows the collected liquid to be discharged in a short time.

As described above, the present embodiment has the following advantages.

(1) The three-way valve 10, which is connected to the air supply device 6, causes the internal pressure of the collected liquid storage portion 48 to be increased when the collected liquid is discharged from the collected liquid storage portion 48 of the oil separator 3. The pressure increase pushes the collected liquid toward the collected liquid discharge port 3c. Thus, the liquid collected in the oil separator 3 is discharged in a short time.

(2) When liquid that contains oil discharged from the air dryer 2 is collected by the oil separator 3, the three-way valve 10 switches the flow direction upstream of the oil separator 3 such that fluid flows from the liquid discharge port 2c of the air dryer 2 toward the liquid inlet port 3a of the oil separator 3. Furthermore, when the collected liquid that is collected by the oil separator 3 is discharged, the three-way valve 10 switches the flow direction upstream of the oil separator 3 such that air flows from the air supply device 6 toward the oil separator 3. Thus, the air delivered from the air supply device 6 increases the pressure in the oil separator 3, pushing out the collected liquid stored in the oil separator 3 through the collected liquid discharge port 3c. For this reason, the liquid collected in the oil separator 3 is discharged in a short time.

Second Embodiment

An oil separator and a collected liquid discharge system according to a second embodiment will now be described with reference to FIG. 7. The description focuses on the difference between the first embodiment and the second embodiment. In the oil separator and the collected liquid discharge system according to the present embodiment, the structure of the oil separator differs from that of the first embodiment. Thus, the same reference numerals are given to those components that are substantially the same as the corresponding components of the first embodiment in the drawing, and overlapped explanations are omitted.

Figure 7:
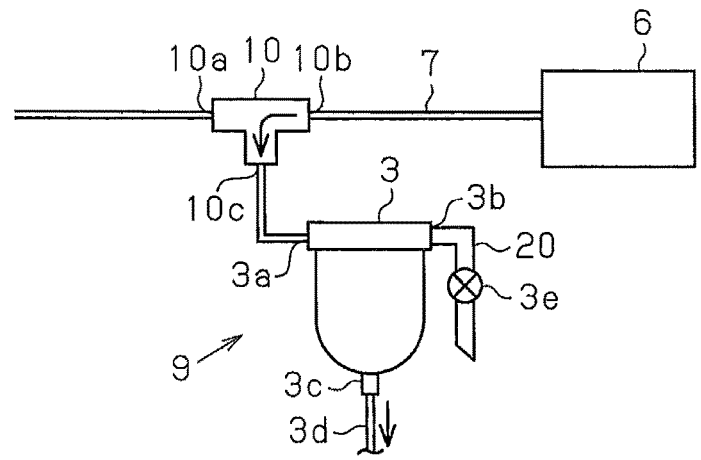
FIG. 7 is a schematic diagram illustrating a collected liquid discharge system according to a second embodiment.

As shown in FIG. 7, the oil separator 3 includes an on-off valve 3e located downstream of the air discharge port 3b and, for example, in the middle of the air discharge hose 20.

The on-off valve 3e stops expelling cleaned air from the air discharge port 3b when the on-off valve 3e is closed and discharges cleaned air from the air discharge port 3b when the on-off valve 3e is opened. The on-off valve 3e is closed when the liquid collected by the oil separator 3 is started to be discharged.

Operation of the present embodiment will now be described.

When collected liquid is started to be discharged, the collected liquid discharge hose 3d, which is connected to the oil separator 3, is moved from the predetermined position to open the collected liquid discharge port 3c as described above. Furthermore, the on-off valve 3e of the oil separator 3 is closed, and the supply valve of the air supply device 6 is opened to supply air to the air supply passage 7. When air is supplied from the air supply passage 7, the flow direction of the three-way valve 10 is switched such that air flows from the second inlet 10b toward the outlet 10c.

The air that has flowed into the oil separator 3 via the three-way valve 10 passes through the oil trap 40 and is introduced to the collected liquid storage portion 48 without being discharged from the air discharge port 3b. Thus, the collected liquid stored in the collected liquid storage portion 48 is pushed with a great pressure, and the collected liquid is discharged in a short time.

As described above, the present embodiment has the following advantage as well as the advantages (1) to (2).

(3) When liquid that is collected in the oil separator 3 is discharged, the air discharge port 3b, which is not connected to the air supply passage 7, is closed. Thus, the pressure in the oil separator 3 is further increased by supplying air through the liquid inlet port 3a, which is connected to the air supply passage 7. For this reason, the collected liquid is discharged in a short time.

Third Embodiment

An oil separator and a collected liquid discharge system according to a third embodiment will now be described with reference to FIG. 8. The description focuses on the difference between the first embodiment and the third embodiment. In the oil separator and the collected liquid discharge system of the present embodiment, the structure of the gas supply source differs from that of the first embodiment. Thus, the same reference numerals are given to those components that are substantially the same as the corresponding components of the first embodiment in the drawing, and overlapped explanations are omitted.

Figure 8:
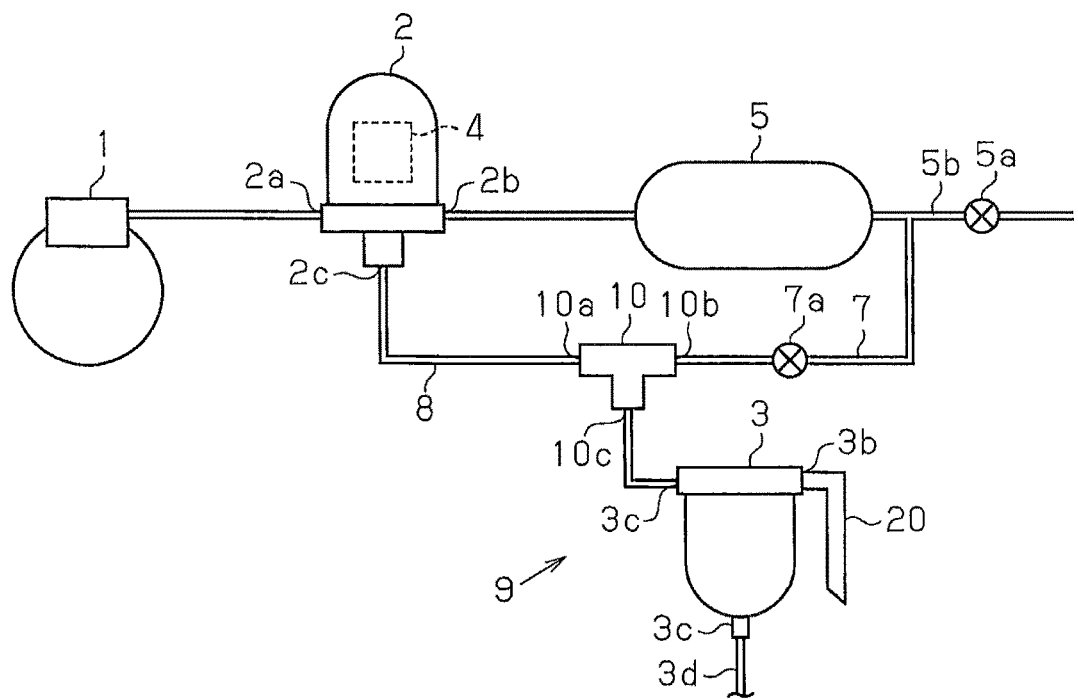
FIG. 8 is a schematic diagram illustrating a collected liquid discharge system according to a third embodiment.

As shown in FIG. 8, the second inlet 10b of the three-way valve 10 is connected to the downstream end of the air tank 5, which stores the compressed dried air that flows out of the air dryer 2, via the air supply passage 7. A flow rate regulating valve 7a, which regulates the flow rate of the compressed dried air supplied from the air tank 5 to the oil separator 3, is located in the middle of the air supply passage 7. Furthermore, a dried air supply passage 5b extends from the air tank 5 to be connected to various systems. An on-off valve 5a for selectively opening and closing a dried air supply passage 5b is located in the dried air supply passage 5b. This configuration eliminates the need for using an external air supply source and utilizes the air tank 5, which is provided in the compressed air drying system.

Operation of the present embodiment will now be described.

When collected liquid is started to be discharged, the collected liquid discharge hose 3d, which is connected to the oil separator 3, is moved from the predetermined position to open the collected liquid discharge port 3c as described above. Furthermore, the on-off valve 5a located downstream of the air tank 5 is closed, and the flow rate regulating valve 7a is opened to supply air to the air supply passage 7.

Some of the compressed dried air supplied from the air tank 5 passes through the oil trap 40 and is then discharged from the air discharge port 3b, and the remaining part of the compressed dried air is introduced into the collected liquid storage portion 48. Increase in the pressure in the collected liquid storage portion 48 causes the collected liquid to be pushed out through the collected liquid discharge port 3c.

As described above, the present embodiment has the following advantage as well as the advantages (1) to (2).

(4) The air supply passage 7, which is connected to the three-way valve 10, is connected to the air tank 5, which stores the compressed dried air that flowed out of the air dryer 2. This configuration eliminates the need for providing a dedicated air tank and utilizes the existing air tank 5.

Other Embodiments

The above described embodiments may be modified as follows.

The oil separator 3 may have other structures as long as the liquid inlet port 3a, the oil trap 40, the air discharge port 3b, and the collected liquid discharge port 3c are provided. For example, the oil trap 40 may be made of, for example, finely porous metal material (such as a crushed aluminum member) or baffle plates.

In each of the above-mentioned embodiments, the collected liquid discharge hose 3d is connected to the collected liquid discharge port 3c of the oil separator 3. However, the collected liquid discharge hose 3d may be omitted, and a plug may be provided in the collected liquid discharge port 3c to directly discharge the collected liquid from the collected liquid discharge port 3c.

The number of the heater 49 may be changed as required, and the heater 49 may also be omitted.

The oil separator 3 may be a cartridge in which the accommodation member 30 is secured to the main body including the case 11 with a threaded portion. The cover 25 may also be omitted.

The structure for connecting the liquid inlet port 3a to the hose of the air dryer and the structure for connecting the air discharge port 3b to the air discharge hose 20 may be other known connecting structures.

A through-hole for discharging air may be formed in the bottom wall of the accommodation member 30.

In each of the above-mentioned embodiments, the outlet 10c of the three-way valve 10 is connected to the liquid inlet port 3a of the oil separator 3, but may be connected to the air discharge port 3b. In this case also, when the collected liquid is discharged, air is supplied from the air supply device 6 or the air tank 5 to increase the pressure in the oil separator 3. In this manner, if the oil separator 3 has the on-off valve 3e as in the second embodiment, the on-off valve 3e is located on the side of the liquid inlet port 3a.

In each of the above-mentioned embodiments, the air supply device 6 or the air tank 5 is connected to the oil separator 3 via the three-way valve 10. However, a gas supply source that supplies gas other than air such as nitrogen may be connected to the oil separator 3.

In each of the above-mentioned embodiments, the directional control valve is a three-way valve, but may be any valves that are capable of switching the flow direction. For example, an electromagnetic valve, which switches the flow direction by selectively energizing and de-energizing the valve, or a hydraulic valve, which switches the flow direction by hydraulic pressure, may be employed. These valves are controlled by a control device.

In each of the above-mentioned embodiments, the oil separator 3 is provided in the exhaust system of the air dryer 2, which is downstream of the compressor 1 of the air system. However, the oil separator 3 may be located downstream of the compressor 1 of the air system and upstream of the air dryer 2. In this case, oil is separated from the air containing, for example, lubricant in the compressor 1, and cleaned air is supplied to the air dryer 2. Thus, the desiccant in the air dryer 2 is prevented from being deteriorated due to the oil.

Figure 9:
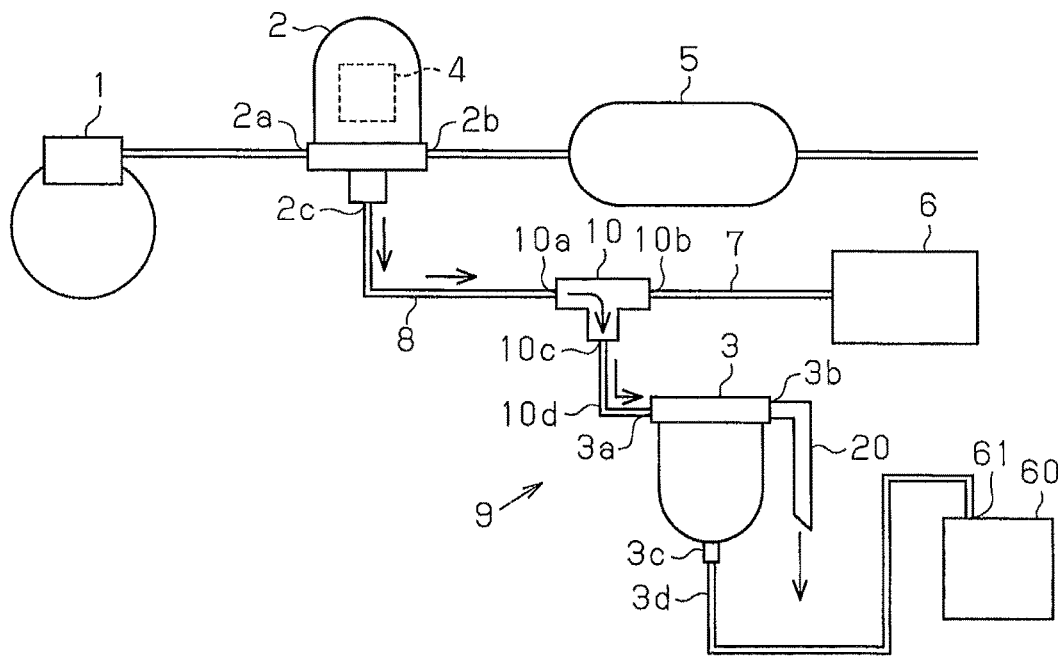
FIG. 9 is a schematic diagram illustrating the structure of a collected liquid discharge system according to a modification.

As shown in FIG. 9, a collected liquid reservoir tank 60 may be connected to the collected liquid discharge port 3c of the oil separator 3 via the collected liquid discharge hose 3d. The collected liquid reservoir tank 60 stores the collected liquid discharged from the oil separator 3. Conventionally, if the collected liquid reservoir tank 60 is connected to the oil separator, the collected liquid is drained from the oil separator by gravity into the collected liquid reservoir tank 60. In the collected liquid discharge system of each of the above-mentioned embodiments, the collected liquid stored in the collected liquid storage portion 48 of the oil separator 3 is discharged by increasing the pressure in the collected liquid storage portion 48 by supplying air from the air supply device 6. Thus, an introduction port 61 of the collected liquid reservoir tank 60 (or the liquid surface of the collected liquid reservoir tank 60) may be located higher than the collected liquid discharge port 3c of the oil separator 3 in the vertical direction.

Figure 10:
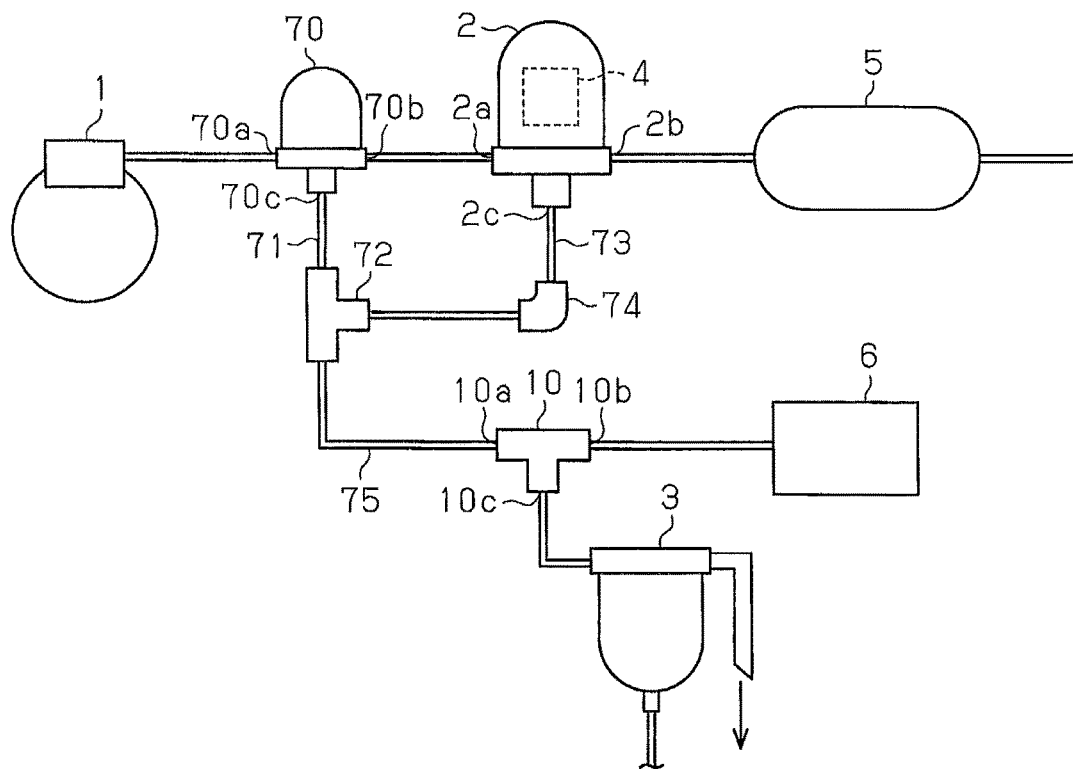
FIG. 10 is a schematic diagram illustrating the structure of a collected liquid discharge system according to a modification.

As shown in FIG. 10, the compressed air drying system may include an oil mist separator 70 in addition to the air dryer 2 and the oil separator 3. The oil mist separator 70 includes a filter for trapping oil mist and differs from the air dryer 2 in that it does not have a desiccant. The oil mist separator 70 is located between the compressor 1 and the air dryer 2. The oil mist separator 70 has an inlet 70a, which is connected to the compressor 1, and an outlet 70b, which is connected to the inlet 2a of the air dryer 2. The outlet 70b discharges air from which oil mist has been removed. The oil mist separator 70 further includes a liquid discharge valve. When the liquid discharge valve is opened, the compressed air is discharged from a liquid discharge port 70c together with the oil trapped by the filter. A hose 71 and a branch pipe 72 are connected to the liquid discharge port 70c of the oil mist separator 70. Furthermore, a coupling pipe 74 is connected to the liquid discharge port 2c of the air dryer 2 via a hose 73. The branch pipe 72 is connected to the first inlet 10a of the three-way valve 10 with a hose 75. When the liquid is discharged from the oil mist separator 70 and the air dryer 2, the three-way valve 10 switches the internal flow direction such that fluid flows from the first inlet 10a toward the outlet 10c. Furthermore, when the collected liquid is to be discharged from the oil separator 3, the three-way valve 10 switches the internal flow direction such that air flows from the second inlet 10b toward the outlet 10c.

In addition to the liquid inlet port 3a, the oil separator 3 may include an air introduction port, which introduces air into the oil separator 3 to increase the internal pressure of the collected liquid storage portion 48. The air introduction port is connected to an air supply source other than the air supply device 6. The air supply source may be the air tank 5. Furthermore, a flow rate regulating valve may be provided between the air introduction port and the air supply source to regulate the amount of air supplied to the oil separator 3. In this case, the air introduction port and the three-way valve 10 correspond to a mechanism that increases the internal pressure of the reservoir, which is provided in the oil separator 3 and stores the collected liquid.

The compressor 1 is not necessarily coupled to the internal combustion engine, but may have a separate motive power source.

In each of the above-mentioned embodiments, the compressed air drying system is mounted on a vehicle with an internal combustion engine, but may be mounted on a vehicle with a driving source other than the internal combustion engine. Furthermore, the compressed air drying system may be mounted on machines other than vehicles.

DESCRIPTION OF THE REFERENCE NUMERALS

1 . . . Compressor, 2 . . . Air Dryer, 2a . . . Inlet, 2b . . . Outlet, 2c . . . Liquid Discharge Port, 3 . . . Oil Separator, 3a . . . Liquid Inlet Port, 3b . . . Air Discharge Port, 3c . . . Collected liquid Discharge Port, 3d . . . Collected liquid Discharge Hose, 3e . . . On-Off Valve, 4 . . . Desiccant, 5 . . . Air Tank, 5a . . . On-Off Valve, 5b . . . Dried Air Supply Passage, 6 . . . Air Supply Device, 7 . . . Air Supply Passage, 7a . . . Flow Rate Regulating Valve, 8 . . . Liquid Discharge Passage, 9 . . . Collected liquid Discharge System, 10 . . . Three-Way Valve, 10a . . . First Inlet, 10b . . . Second Inlet, 10c . . . Outlet, 10d . . . Coupling Passage (Conduit), 11 . . . Case, 12 . . . Lid, 18 . . . Introduction Coupling Member, 19 . . . Discharge Coupling Member, 20 . . . Air Discharge Hose, 21 . . . Baffle Plate, 22 . . . First Expansion Chamber, 23 . . . Communication Portion, 25 . . . Cover, 26 . . . Flange, 27 . . . Bolt, 28 . . . Communication Hole, 29 . . . Mounting Plate, 30 . . . Accommodation Member, 31 . . . Flange, 32 . . . Flange, 33 . . . Second Expansion Chamber, 34 . . . Upper Wall, 35 . . . Through-hole, 36 . . . Through-hole, 40 . . . Oil Trap, 41 . . . Impingement Member, 45 . . . Support Disk, 46 . . . Screw, 47 . . . Through-hole, 48 . . . Collected liquid Storage Portion, 49 . . . Heater, 50 . . . Communication Hole.

The invention claimed is:

1. An oil separator configured to separate gas and liquid in fluid containing oil to collect liquid, which contains oil, the oil separator comprising:
   an oil trap configured to trap liquid;
   a reservoir configured to store the liquid that is trapped by the oil trap;
   a collected liquid discharge port configured to discharge the liquid stored in the reservoir; and
   a mechanism configured to, when the liquid stored in the reservoir is ready to be discharged, increase an internal pressure of the reservoir such that the increased internal pressure of the reservoir pushes out the liquid stored in the reservoir through the collected liquid discharge port.

2. An oil separator configured to separate gas and liquid in fluid containing oil to collect liquid, which contains oil, the oil separator comprising:
   an oil trap configured to trap liquid;
   a reservoir configured to store the liquid that is trapped by the oil trap;
   a collected liquid discharge port configured to discharge the liquid stored in the reservoir;
   a mechanism configured to increase an internal pressure of the reservoir;
   a liquid inlet port, through which liquid flows in;
   an air discharge port, which discharges air separated from the fluid; and
   a directional control valve, which is connected to a conduit connected to one of the liquid inlet port and the air discharge port, a gas supply passage, which is connected to a gas supply source, and a liquid discharge passage, which delivers liquid to the oil separator,
   wherein the directional control valve is configured to switch between a first communication state, in which the directional control valve connects the liquid discharge passage to the one of the liquid inlet port and the air discharge port, and a second communication state, in which the directional control valve connects the gas supply passage to the one of the liquid inlet port and the air discharge port,
   wherein, in the first communication state, the fluid flowing through the directional control valve flows from the liquid discharge passage to the one of the liquid inlet port and the air discharge port, and
   wherein, in the second communication state, the fluid flowing through the directional control valve flows from the gas supply passage to the one of the liquid inlet port and the air discharge port.

3. The oil separator according to claim 2, further comprising: an on-off valve, which selectively opens and closes the other one of the liquid inlet port and the air discharge port,
   wherein the on-off valve is closed when the communication state of the directional control valve is in the second communication state.

4. The oil separator according to claim 2, wherein the liquid inlet port is configured to be connected to an air dryer, which includes a desiccant and dries compressed air, wherein the oil separator is configured to separate gas and liquid in fluid, which contains oil and is discharged from the air dryer, thereby collecting liquid in the reservoir, and
   wherein the directional control valve is configured to be connected to an air tank, which stores compressed dried air that has flowed out of the air dryer via the gas supply passage.

5. A collected liquid discharge system comprising:
   an oil separator configured to separate gas and liquid in fluid containing oil to collect liquid, which contains oil, the oil separator comprising:
      an oil trap configured to trap liquid;
      a reservoir configured to store the liquid that is trapped by the oil trap;
      a collected liquid discharge port configured to discharge the liquid stored in the reservoir;
      a mechanism configured to increase an internal pressure of the reservoir;
   a gas supply source, which supplies gas to the oil separator;
   a liquid inlet port, through which liquid flows in;
   an air discharge port, which discharges air separated from the fluid; and
   a directional control valve, which is connected to a conduit connected to one of the liquid inlet port and the air discharge port, a gas supply passage, which is connected to a gas supply source, and a liquid discharge passage, which delivers liquid to the oil separator,
   wherein the directional control valve is configured to switch between a first communication state, in which the directional control valve connects the liquid discharge passage to the one of the liquid inlet port and the air discharge port, and a second communication state, in which the directional control valve connects the gas supply passage to the one of the liquid inlet port and the air discharge port,
   wherein, in the first communication state, the fluid flowing through the directional control valve flows from the liquid discharge passage to the one of the liquid inlet port and the air discharge port, and wherein, in the second communication state, the fluid flowing through the directional control valve flows from the gas supply passage to the one of the liquid inlet port and the air discharge port.

6. The system according to claim 5, wherein the oil separator further comprises: an on-off valve, which selectively opens and closes the other one of the liquid inlet port and the air discharge port, wherein the on-off valve is closed when the communication state of the directional control valve is in the second communication state.

7. The system according to claim 5, wherein the liquid inlet port is configured to be connected to an air dryer, which includes a desiccant and dries compressed air, wherein the oil separator is configured to separate gas and liquid in fluid, which contains oil and is discharged from the air dryer, thereby collecting liquid in the reservoir, and wherein the directional control valve is configured to be connected to an air tank, which stores compressed dried air that has flowed out of the air dryer via the gas supply passage.

8. The oil separator according to claim 1, wherein the oil separator is configured to be connected to an air dryer, which includes a desiccant and dries compressed air from a compressor, and wherein the oil separator is configured to separate gas and liquid in fluid, which contains oil and is discharged from the air dryer, thereby collecting liquid in the reservoir.

* * * * *